United States Patent
Zhang

(10) Patent No.: US 11,405,704 B2
(45) Date of Patent: Aug. 2, 2022

(54) DOWNLINK BANDWIDTH TRANSMISSION METHOD AND APPARATUS FOR PASSIVE OPTICAL NETWORK

(71) Applicant: ZTE Corporation, Shenzhen (CN)

(72) Inventor: Weiliang Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 117 days.

(21) Appl. No.: 16/760,499

(22) PCT Filed: Oct. 31, 2018

(86) PCT No.: PCT/CN2018/113132
§ 371 (c)(1),
(2) Date: Apr. 30, 2020

(87) PCT Pub. No.: WO2019/085954
PCT Pub. Date: May 9, 2019

(65) Prior Publication Data
US 2021/0377636 A1 Dec. 2, 2021

(30) Foreign Application Priority Data
Nov. 1, 2017 (CN) .......................... 201711060252.3

(51) Int. Cl.
*H04Q 11/00* (2006.01)
(52) U.S. Cl.
CPC . *H04Q 11/0067* (2013.01); *H04Q 2011/0064* (2013.01); *H04Q 2011/0086* (2013.01)

(58) Field of Classification Search
CPC ... H04B 10/27; H04Q 11/0067; H04J 14/086; H04J 3/16; H04J 3/167
See application file for complete search history.

(56) References Cited

U.S. PATENT DOCUMENTS

| | | | |
|---|---|---|---|
| 2004/0252714 A1* | 12/2004 | Oh | H04Q 11/0067 370/437 |
| 2014/0133858 A1* | 5/2014 | Fang | H04J 3/00 398/66 |

(Continued)

FOREIGN PATENT DOCUMENTS

| CN | 1507207 A | 6/2004 |
|---|---|---|
| CN | 1953353 A | 4/2007 |
| CN | 103428586 A | 12/2013 |

(Continued)

OTHER PUBLICATIONS

International Search Report for corresponding PCT/CN2018/113132 application filed Oct. 31, 2018; dated Feb. 11, 2019.

(Continued)

*Primary Examiner* — Dzung D Tran
(74) *Attorney, Agent, or Firm* — Cantor Colburn LLP

(57) ABSTRACT

A downstream bandwidth transmission method for a passive optical network includes: performing a downstream bandwidth allocation (101); sending a result of the downstream bandwidth allocation (102); and sending traffic data based on the result of the downstream bandwidth allocation, where the result of the downstream bandwidth allocation carries optical network unit (ONU) indication information (103).

20 Claims, 8 Drawing Sheets

(56) References Cited

U.S. PATENT DOCUMENTS

2014/0233950 A1* 8/2014 Luo .................. H04Q 11/0067
                                              398/66
2017/0223438 A1* 8/2017 Detwiler ............... H04Q 11/00

FOREIGN PATENT DOCUMENTS

| CN | 103595561 A | 2/2014 |
| CN | 103905336 A | 7/2014 |
| CN | 104038442 A | 9/2014 |
| EP | 2965535 A1  | 1/2016 |

OTHER PUBLICATIONS

Chinese Office Action for corresponding application 2017110602523 filed Nov. 1, 2017; dated Dec. 28, 2020.
Chinese Office Action for corresponding application 2017110602523 filed Nov. 1, 2017; dated Jul. 6, 2021.
Chinese Search Report for corresponding application 2017110602523 filed Nov. 1, 2017; dated Dec. 28, 2020.
European Search Report for corresponding application EP18874268; dated Jul. 23, 2021.
Frank Effenberger, Futurewei Technologies, "Downstream Bursting for Power Savings", Fuzhou, Feb. 24, 2013, XP044076462.
Gigabit-capable Passive Optical Networks (G-PON): Transmission Convergence Layer Specification, International Telecommunication Union, Mar. 29, 2008; XP017433831.

\* cited by examiner

| | Octets |
|---|---|
| Destination address | 6 |
| Source address | 6 |
| Length/Type=0x8808 | 2 |
| Opcode=0x0012 | 2 |
| Timestamp | 4 |
| Channel assignment | 1 |
| GR STAT | 4 |
| PLID #1 | 2 |
| GR length #1 | FR | F | 3 |
| PLID #2 | 0/2 |
| GR length #2 | FR | F | 0/3 |
| PLID #3 | 0/2 |
| GR length #3 | FR | F | 0/3 |
| PLID #4 | 0/2 |
| GR length #4 | FR | F | 0/3 |
| PLID #5 | 0/2 |
| GR length #5 | FR | F | 0/3 |
| PLID #6 | 0/2 |
| GR length #6 | FR | F | 0/3 |
| PLID #7 | 0/2 |
| GR length #7 | FR | F | 0/3 |
| Pad/Reserved | 0-30 |
| FCS | 4 |

Eight bytes in the frame transmitted from top to bottom

FIG. 17

DOWNLINK BANDWIDTH TRANSMISSION METHOD AND APPARATUS FOR PASSIVE OPTICAL NETWORK

CROSS-REFERENCE TO RELATED APPLICATIONS

This is a National Stage Application, filed under 35 U.S.C. 371, of International Patent Application No. PCT/CN2018/113132, filed on Oct. 31, 2018, which claims the priority of Chinese patent application No. 201711060252.3 filed on Nov. 1, 2017, contents of both of which are incorporated herein by reference in their entireties.

TECHNICAL FIELD

The present disclosure relates to, but is not limited to, the field of communications and, in particular, relates to a downstream bandwidth transmission method and apparatus for a passive optical network.

BACKGROUND

A traditional passive optical network system has a point-to-multipoint network topology. One optical line terminal (OLT) is connected to multiple optical network units (ONUs) through an optical distribution network (ODN). In a downstream direction, all ONUs will receive data sent by the OLT. Therefore, no matter which ONU is downstream data sent to, every ONU needs to attempt to parse the downstream data, only when the parsed downstream data is sent to itself, the ONU receives the downstream data; and the ONU will discard the downstream data when the parsed downstream data is not sent to itself. In a process of parsing the downstream data, a frame header may be generally determined, including a frame header detection, an error correction, an identification determination, etc., which increases complexity, power consumption, even costs and so on of the ONU. In addition, when parsing of a certain frame header in the downstream data fails, it may also cause rest of the downstream data to be lost.

In the passive optical network system, in some cases, the OLT performs bandwidth scheduling in the downstream direction, but does not notify the ONU of the other party of a result of the bandwidth scheduling which is only used locally. Using this kind of scheduling manner, on one hand, the OLT adjusts scheduling in real time in a certain manner, which requires complex algorithms; on the other hand, the OLT does not notify the other party of the scheduling result, the ONU needs to parse frames one by one, and each ONU can only perform serial processing, which has a low efficiency and it is inferior to parallel processing of ONUs with a high efficiency.

SUMMARY

The present disclosure provides a downstream bandwidth transmission method and apparatus for a passive optical network, so as to improve efficiency and reduce complexity.

Schemes of the embodiments of the present disclosure are implemented as described below.

The present disclosure provides a downstream bandwidth transmission method for a passive optical network. The method includes steps described below. An OLT performs a downstream bandwidth allocation. The OLT sends a result of the downstream bandwidth allocation. The OLT sends traffic data based on the result of the downstream bandwidth allocation. The result of the downstream bandwidth allocation sent by the OLT carries optical network unit (ONU) indication information.

The present disclosure further provides a downstream bandwidth transmission apparatus for a passive optical network. The apparatus includes a processor and a memory configured to store computer programs executable on the processor, where the processor is configured to: when executing the computer programs, perform steps of the method described above.

The present disclosure further provides a downstream bandwidth transmission method for a passive optical network. The method includes steps described below. An ONU receives and parses a result of a downstream bandwidth allocation. The ONU receives traffic data in a corresponding slot based on ONU indication information in the result of downstream bandwidth allocation. The result of downstream bandwidth allocation carries the optical network unit (ONU) indication information.

The present disclosure further provides a downstream bandwidth transmission apparatus for a passive optical network. The apparatus includes a processor and a memory configured to store computer programs executable on the processor, where the processor is configured to: when executing the computer programs, perform steps of the method described above.

The present disclosure further provides a downstream bandwidth transmission method for a passive optical network. The method includes steps described below. An OLT performs a downstream bandwidth allocation, sends a result of the downstream bandwidth allocation to an ONU, and sends traffic data based on the result of the downstream bandwidth allocation. The ONU receives and parses the result of the downstream bandwidth allocation, and receives traffic data in a corresponding slot based on ONU indication information in the result of the downstream bandwidth allocation. The result of the downstream bandwidth allocation carries the optical network unit (ONU) indication information.

The present disclosure further provides a downstream bandwidth transmission apparatus for a passive optical network. The apparatus includes an allocation module and a sending module. The allocation module is configured to perform a downstream bandwidth allocation. The sending module is configured to send a result of the downstream bandwidth allocation and send traffic data based on the result of the downstream bandwidth allocation. The result of the downstream bandwidth allocation carries optical network unit (ONU) indication information.

The present disclosure further provides a downstream bandwidth transmission apparatus for a passive optical network. The apparatus includes a first receiving module and a second receiving module. The first receiving module is configured to receive and parse a result of a downstream bandwidth allocation. The second receiving module is configured to receive traffic data in a corresponding slot based on ONU indication information in the result of the downstream bandwidth allocation. The result of downstream bandwidth allocation carries the optical network unit (ONU) indication information.

The present disclosure further provides a computer-readable storage medium, which is configured to store computer-executable instructions which, when executed, implement the downstream bandwidth transmission method for the passive optical network described above.

BRIEF DESCRIPTION OF DRAWINGS

FIG. 17 is another structural diagram of a DS_GATE message according to an embodiment of the present disclosure.

DETAILED DESCRIPTION

Embodiments of the present disclosure are described hereinafter in conjunction with the drawings.

Figure 1:
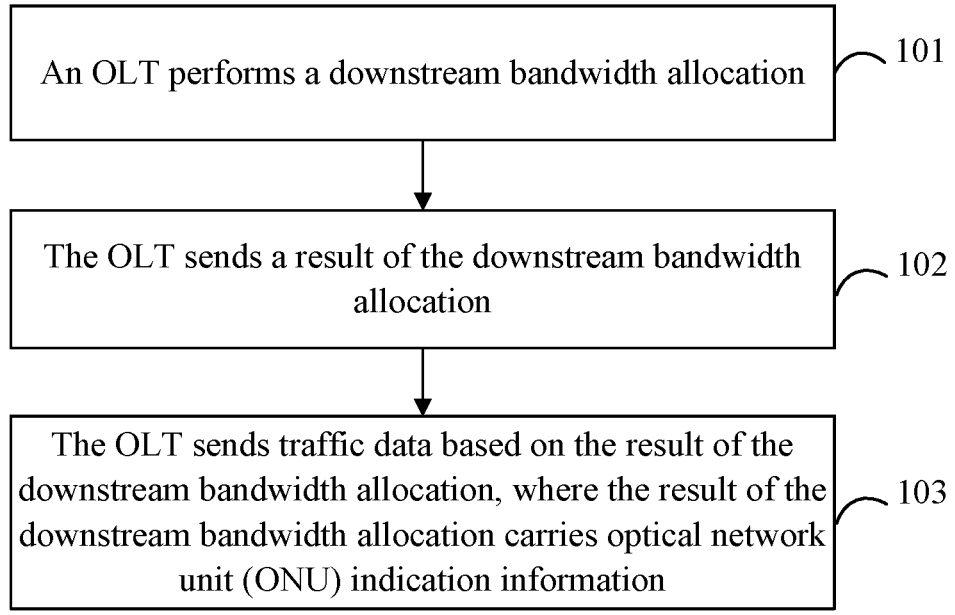
FIG. 1 is a flowchart of a downstream bandwidth transmission method for a passive optical network according to an embodiment of the present disclosure.

An embodiment of the present disclosure provides a downstream bandwidth transmission method for a passive optical network. The method is applied to an OLT. As shown in FIG. 1, the method may include steps described below. In step 101, the OLT performs a downstream bandwidth allocation. In step 102, the OLT sends a result of the downstream bandwidth allocation. In step 103, the OLT sends traffic data based on the result of the downstream bandwidth allocation, where the result of the downstream bandwidth allocation carries optical network unit (ONU) indication information.

In the embodiments of the present disclosure, the ONU indication information may be used for indicating that a downstream bandwidth is allocated to which ONU.

In the embodiments of the present disclosure, the downstream bandwidth is allocated to an ONU, and the corresponding ONU indication information is sent; after parsing the result of the downstream bandwidth allocation, the ONU receives downstream traffic data within the downstream bandwidth sent to the ONU itself, unnecessary parsing and determination behaviors are avoided, thereby improving system efficiency, reducing energy consumption, and simplifying system implementation complexity.

In the embodiments of the present disclosure, the step in which the OLT performs the downstream bandwidth allocation may include that the OLT performs the downstream bandwidth allocation based on a local traffic data queue.

In the embodiments of the present disclosure, the step in which the downstream bandwidth allocation is performed based on the local traffic data queue may include steps described below. One or more local traffic data queues are established, and a priority is configured for each queue of the one or more local traffic data queues. Based on a downstream bandwidth scheduling algorithm, a downstream bandwidth occupied by each queue of the one or more local traffic data queues is determined according to a data length and the priority of each queue of the one or more local traffic data queues, and the downstream bandwidth allocation is performed.

In an embodiment, after the downstream bandwidth occupied by each queue of the one or more local traffic data queues is determined and the downstream bandwidth allocation is performed, the method may further include a step described below. Downstream bandwidths belonging to a same ONU are configured to be consecutive.

In an embodiment, the step of sending the result of the downstream bandwidth allocation may include a step described below. Downstream bandwidth allocation information is carried in a downstream frame, where each downstream bandwidth entry in the downstream bandwidth allocation information includes the ONU indication information (for example, an ONU-ID indicating that the downstream bandwidth is allocated to which ONU, that is, the ONU indication information) and downstream bandwidth feature information (for example, starting time and ending time of the downstream bandwidth, the starting time and a bandwidth length of the downstream bandwidth or the like). Alternatively, an indication message of the downstream bandwidth allocation (for example, a DS_GATE message) is sent, where the indication message carries the ONU indication information (for example, a logical link identification (LLID), a physical link identification (PLID) or the like).

Figure 2:
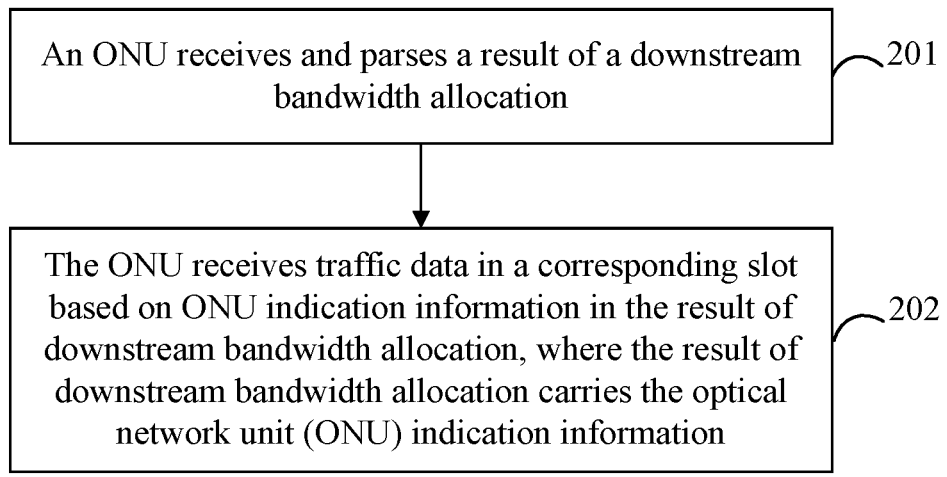
FIG. 2 is a flowchart of another downstream bandwidth transmission method for a passive optical network according to an embodiment of the present disclosure.

An embodiment of the present disclosure further provides a downstream bandwidth transmission method for a passive optical network. As shown in FIG. 2, the method may include steps described below. In step 201, an ONU receives and parses a result of a downstream bandwidth allocation. In step 202, the ONU receives traffic data in a corresponding slot based on ONU indication information in the result of the downstream bandwidth allocation, where the result of downstream bandwidth allocation carries the optical network unit (ONU) indication information.

In the embodiments of the present disclosure, a downstream bandwidth is allocated to the ONU, and the corresponding ONU indication information is sent; and after parsing the result of downstream bandwidth allocation, the ONU receives downstream traffic data within the downstream bandwidth corresponding to the ONU itself, unnecessary parsing and determination behaviors are avoided, thereby improving system efficiency, reducing energy consumption, and simplifying system implementation complexity.

In the embodiments of the present disclosure, the step of receiving and parsing the result of downstream bandwidth allocation may include steps described below. Each downstream bandwidth entry is acquired and parsed. And, it is determined whether the ONU indication information in a downstream bandwidth entry is consistent with identification information of the ONU.

In an embodiment, the step of receiving the traffic data of the corresponding slot (a slot corresponding to the ONU) based on the result of the downstream bandwidth allocation may include steps described below. When it is determined that the ONU indication information in the downstream bandwidth entry is consistent with the identification information of the ONU, the downstream bandwidth feature information in the downstream bandwidth entry is acquired, and the traffic data in the corresponding slot is obtained based on the downstream bandwidth feature information.

In an embodiment, the step of receiving the traffic data in the corresponding slot based on the result of the downstream bandwidth allocation may include a step described below. When it is determined that the ONU indication information in the downstream bandwidth entry is inconsistent with the identification information of the ONU, no subsequent processing is performed on the downstream bandwidth entry and a downstream bandwidth corresponding to the downstream bandwidth entry (operations such as acquisition of the downstream bandwidth feature information and acquisition of the traffic data are not performed).

An embodiment of the present disclosure further provides a downstream bandwidth transmission method for a passive optical network. The method may include steps described below. An OLT performs a downstream bandwidth allocation, sends a result of the downstream bandwidth allocation to an ONU, and sends traffic data based on the result of the downstream bandwidth allocation. The ONU receives and parses the result of the downstream bandwidth allocation, and receives traffic data in a corresponding slot based on ONU indication information in the result of the downstream bandwidth allocation. Where, the result of the downstream bandwidth allocation carries the optical network unit (ONU) indication information.

Figure 3:
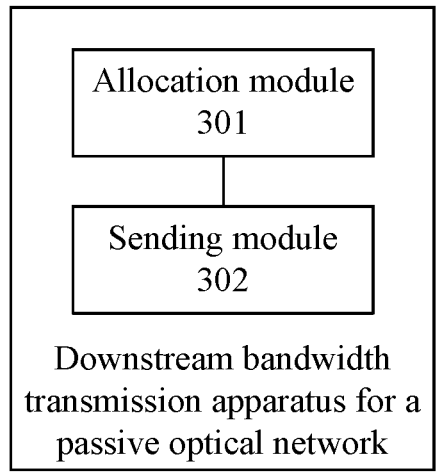
FIG. 3 is a structural diagram of a downstream bandwidth transmission apparatus for a passive optical network according to an embodiment of the present disclosure.

An embodiment of the present disclosure further provides a downstream bandwidth transmission apparatus for a passive optical network. As shown in FIG. 3, the apparatus may include an allocation module 301 and a sending module 302. The allocation module 301 is configured to perform a downstream bandwidth allocation. The sending module 302 is configured to send a result of the downstream bandwidth allocation and send traffic data based on the result of the downstream bandwidth allocation. The result of the downstream bandwidth allocation carries optical network unit (ONU) indication information.

In an embodiment, the allocation module 301 may perform the downstream bandwidth allocation by performing the downstream bandwidth allocation based on a local traffic data queue.

Figure 4:
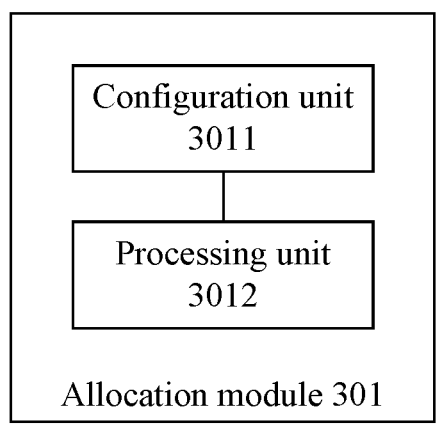
FIG. 4 is a structural diagram of an allocation module according to an embodiment of the present disclosure.

In an embodiment, as shown in FIG. 4, the allocation module 301 may include a configuration unit 3011 and a processing unit 3012. The configuration unit 3011 is configured to establish one or more local traffic data queues, and configure a priority for each queue of the one or more local traffic data queues. The processing unit 3012 is configured to: based on a downstream bandwidth scheduling algorithm, determine a downstream bandwidth occupied by each queue of the one or more local traffic data queues according to a data length and the priority of each queue of the one or more local traffic data queues, and perform the downstream bandwidth allocation.

Figure 5:
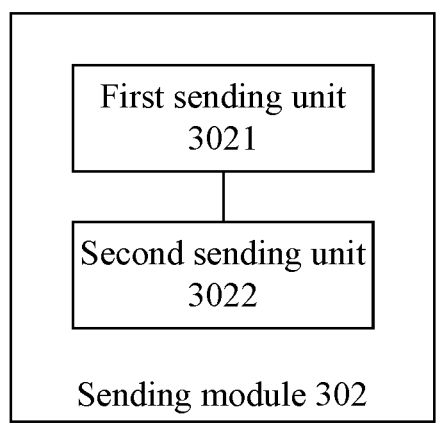
FIG. 5 is a structural diagram of a sending module according to an embodiment of the present disclosure.

In the embodiments of the present disclosure, as shown in FIG. 5, the sending module 302 may include a first sending unit 3021 or a second sending unit 3022. The first sending unit 3021 is configured to carry downstream bandwidth allocation information in a downstream superframe, where each downstream bandwidth entry in the downstream bandwidth allocation information includes the ONU indication information and downstream bandwidth feature information. The second sending unit 3022 is configured to send an indication message of the downstream bandwidth allocation, where the indication message carries the ONU indication information.

In an embodiment, the allocation module 301 may be further configured to configure downstream bandwidths belonging to a same ONU to be consecutive.

Figure 6:
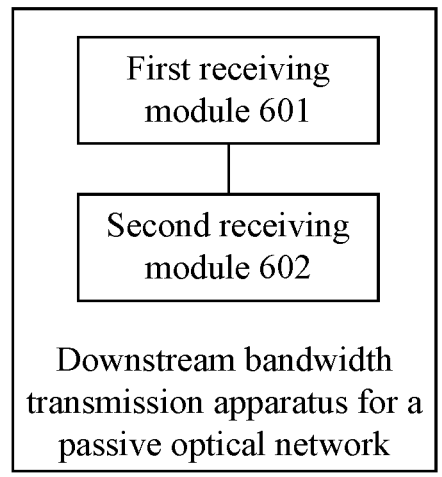
FIG. 6 is a structural diagram of another downstream bandwidth transmission apparatus for a passive optical network according to an embodiment of the present disclosure.

An embodiment of the present disclosure further provides a downstream bandwidth transmission apparatus for a passive optical network. As shown in FIG. 6, the apparatus may include a first receiving module 601 and a second receiving module 602. The first receiving module 601 is configured to receive and parse a result of a downstream bandwidth allocation. The second receiving module 602 is configured to receive traffic data in a corresponding slot based on ONU indication information in the result of the downstream bandwidth allocation, where the result of the downstream bandwidth allocation carries the optical network unit (ONU) indication information.

Figure 7:
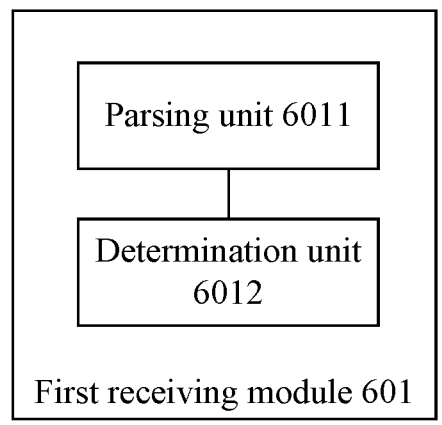
FIG. 7 is a structural diagram of a first receiving module according to an embodiment of the present disclosure.

In the embodiments of the present disclosure, as shown in FIG. 7, the first receiving module 601 may include a parsing unit 6011 and a determination unit 6012. The parsing unit 6011 is configured to acquire and parse each downstream bandwidth entry. The determination unit 6012 is configured to determine whether the ONU indication information in a downstream bandwidth entry is consistent with identification information of an ONU.

In the embodiments of the present disclosure, the second receiving module 602 may receive the traffic data in the corresponding slot based on the result of the downstream bandwidth allocation in a manner described below. When it is determined that the ONU indication information in the downstream bandwidth entry is consistent with the identification information of the ONU, downstream bandwidth feature information in the downstream bandwidth entry is acquired, and the traffic data in the corresponding slot is obtained based on the downstream bandwidth feature information.

An embodiment of the present disclosure further provides a downstream bandwidth transmission system for a passive optical network. The system may include an OLT and one or more ONUs. The OLT is configured to: perform a downstream bandwidth allocation, send a result of the downstream bandwidth allocation to the one or more ONUs, and send traffic data based on the result of the downstream bandwidth allocation. Each of the one or more ONUs is configured to: receive and parse the result of the downstream bandwidth allocation, and receive traffic data in a corresponding slot based on ONU indication information in the result of the downstream bandwidth allocation, where the result of the downstream bandwidth allocation carries the optical network unit (ONU) indication information.

An embodiment of the present disclosure further provides a downstream bandwidth transmission apparatus for a passive optical network. The apparatus may include a processor and a memory configured to store computer programs executable on the processor. The processor is configured to: when executing the computer programs, perform a downstream bandwidth allocation, send a result of the downstream bandwidth allocation, and send traffic data based on the result of the downstream bandwidth allocation. The result of the downstream bandwidth allocation carries optical network unit (ONU) indication information.

When an OLT performs the downstream bandwidth allocation, the processor may be further configured to: when executing the computer programs, perform the downstream bandwidth allocation based on a local traffic data queue.

When the downstream bandwidth allocation is performed based on the local traffic data queue, the processor may be further configured to: when executing the computer programs, perform steps described below. One or more local traffic data queues are established, and a priority is configured for each queue of the one or more local traffic data queues. Based on a downstream bandwidth scheduling algorithm, a downstream bandwidth occupied by each queue of the one or more local traffic data queues is determined according to a data length and the priority of each queue of the one or more local traffic data queues, and the downstream bandwidth allocation is performed.

After the downstream bandwidth occupied by each queue of the one or more local traffic data queues is determined and the downstream bandwidth allocation is performed, the processor may be further configured to: when executing the computer programs, configure downstream bandwidths belonging to a same ONU to be consecutive.

When the result of the downstream bandwidth allocation is sent, the processor may be further configured to: when executing the computer programs, perform a step described below. Downstream bandwidth allocation information is carried in a downstream frame, where each downstream bandwidth entry in the downstream bandwidth allocation information includes the ONU indication information and downstream bandwidth feature information. Alternatively, an indication message of the downstream bandwidth allocation is sent, where the indication message carries the ONU indication information.

An embodiment of the present disclosure further provides a downstream bandwidth transmission apparatus for a passive optical network. The apparatus may include a processor and a memory configured to store computer programs executable on the processor. The processor is configured to: when executing the computer programs, receive and parse a result of a downstream bandwidth allocation, and receive traffic data in a corresponding slot based on ONU indication information in the result of downstream bandwidth allocation. The result of downstream bandwidth allocation carries the optical network unit (ONU) indication information.

When the result of downstream bandwidth allocation is received and parsed, the processor may be further configured to: when executing the computer programs, perform steps described below. Each downstream bandwidth entry is acquired and parsed. And it is determined whether the ONU indication information in the downstream bandwidth entry is consistent with identification information of an ONU.

When the traffic data in the corresponding slot is received based on the result of the downstream bandwidth allocation, the processor may be further configured to: when executing the computer programs, perform a step described below. When it is determined that the ONU indication information in the downstream bandwidth entry is consistent with the identification information of the ONU, downstream bandwidth feature information in the downstream bandwidth entry is acquired, and the traffic data in the corresponding slot is obtained based on the downstream bandwidth feature information.

It may be illustrated that when the apparatus according to the above-mentioned embodiments performs a downstream bandwidth transmission, an exemplary description is provided merely through the division of program modules described above. In practical applications, the processing described above may be assigned to different program modules to be implemented according to needs, that is, an internal structure of a device is divided into different program modules to implement all or part of the processing described above. In addition, the apparatus according to the above-mentioned embodiments has the same concept as the corresponding method embodiments, and for an implementation process, reference is made to the method embodiments and repetition is not made herein.

In an exemplary embodiment, the embodiment of the present disclosure further provides a computer-readable storage medium. The computer-readable storage medium may be a ferroelectric random access memory (FRAM), a read-only memory (ROM), a programmable read-only memory (PROM), an electrically programmable read-only memory (EPROM), an electrically erasable programmable read-only memory (EEPROM), a flash memory, a magnetic surface memory, an optical disk, a compact disc read-only memory (CD-ROM) or other memories, or may be any device including one or any combination of the memories described above, such as a mobile phone, a computer, a tablet device or a personal digital assistant.

An embodiment of the present disclosure further provides a computer-readable storage medium, storing computer programs thereon. The computer programs, when executed by a processor, may perform steps described below. A downstream bandwidth allocation is performed. A result of the downstream bandwidth allocation is sent. Traffic data is sent based on the result of the downstream bandwidth allocation. Where, the result of the downstream bandwidth allocation carries optical network unit (ONU) indication information.

When an OLT performs the downstream bandwidth allocation, the computer programs, when executed by the processor, may further perform a step described below. The downstream bandwidth allocation is performed based on a local traffic data queue.

When the downstream bandwidth allocation is performed based on the local traffic data queue, the computer programs, when executed by the processor, may further perform steps described below. One or more local traffic data queues are established, and a priority is configured for each queue of the one or more local traffic data queues. Based on a downstream bandwidth scheduling algorithm, a downstream bandwidth occupied by each queue of the one or more local traffic data queues is determined according to a data length and the priority of each queue of the one or more local traffic data queues, and the downstream bandwidth allocation is performed.

After the downstream bandwidth occupied by each queue of the one or more local traffic data queues is determined and the downstream bandwidth allocation is performed, the computer programs, when executed by the processor, may further perform a step described below. Downstream bandwidths belonging to a same ONU are configured to be consecutive.

When the result of the downstream bandwidth allocation is sent, the computer programs, when executed by the processor, may further perform a step described below. Downstream bandwidth allocation information is carried in a downstream frame, where each downstream bandwidth entry in the downstream bandwidth allocation information includes the ONU indication information and downstream bandwidth feature information. Alternatively, an indication message for the downstream bandwidth allocation is sent, where the indication message carries the ONU indication information.

An embodiment of the present disclosure further provides a computer-readable storage medium, storing computer programs thereon. The computer programs, when executed by a processor, may perform steps described below. A result of a downstream bandwidth allocation is received and parsed. Traffic data in a corresponding slot is received based on ONU indication information in the result of downstream bandwidth allocation. The result of downstream bandwidth allocation carries the optical network unit (ONU) indication information.

When the result of downstream bandwidth allocation is received and parsed, the computer programs, when executed by the processor, may further perform steps described below. Each downstream bandwidth entry is acquired and parsed. And it is determined whether the ONU indication information in a downstream bandwidth entry is consistent with identification information of an ONU.

When the traffic data in the corresponding slot is received based on the result of downstream bandwidth allocation, the computer programs, when executed by the processor, may further perform a step described below. It is determined that the ONU indication information in the downstream bandwidth entry is consistent with the identification information of the ONU, downstream bandwidth feature information in the downstream bandwidth entry is acquired, and the traffic data in the corresponding slot is obtained based on the downstream bandwidth feature information.

The embodiments of the present disclosure are described below in conjunction with scenario embodiments.

In some cases, an Ethernet passive optical network (EPON)/10 gigabit Ethernet passive optical network (10 GEPON) ONU obtains a starting position of an LLID by detecting a start of the LLID delimiter (SLD) of 1 to 5 bytes in a preamble/start of frame delimiter (SFD), and obtains the LLID from 6 to 7 bytes, the ONU further needs to determine whether the LLID belongs to the ONU itself through 8-byte cyclic redundancy check (CRC 8) check, and receives the corresponding Ethernet frame when the LLID belongs to the ONU itself, that is to say, even if a certain media access control (MAC) frame does not belong to this ONU, the ONU still needs to detect the preamble/SFD, which causes a waste of resources. Moreover, once a detection of a preamble/SFD field, for example, the CRC 8 check fails, it is necessary to continue detecting the preamble/SFD, and all detections before a next MAC frame are wasted.

Figure 8:
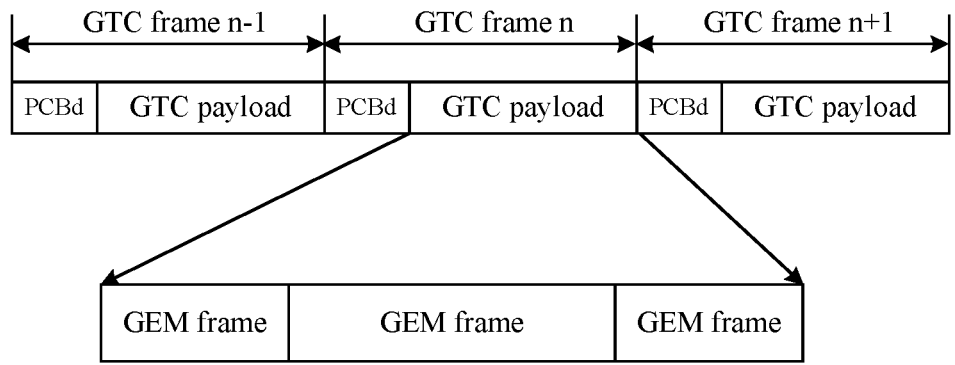
FIG. 8 is a structural diagram of a traditional gigabit passive optical network (GPON) superframe, a GPON transmission convergence (GTC) frame.
Figure 9:
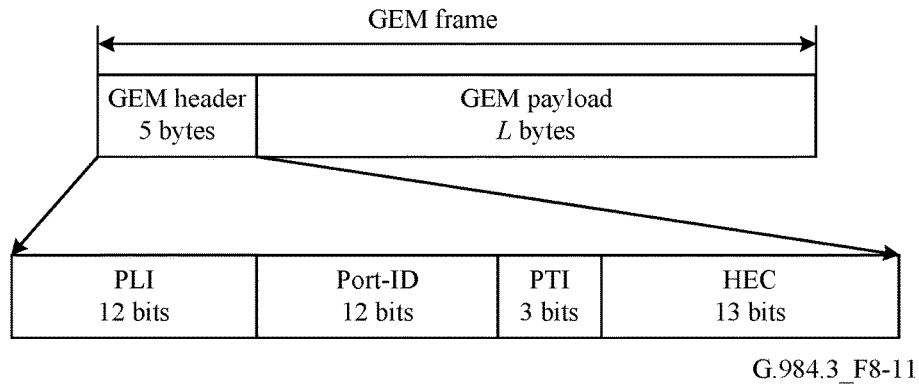
FIG. 9 is a structural diagram of a traditional GPON encapsulation method (GEM) frame.
Figure 10:
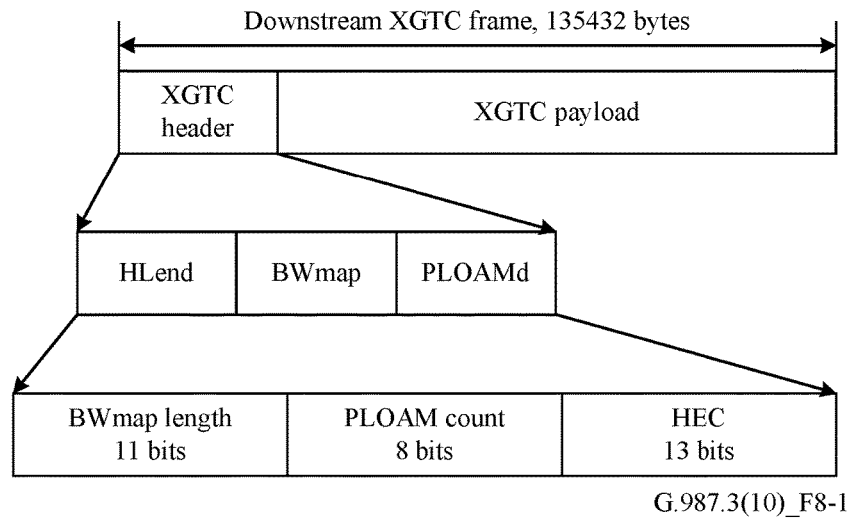
FIG. 10 is a structural diagram of a traditional 10 gigabit passive optical network (XG-PON) superframe, an XG-PON transmission convergence (XGTC) frame.
Figure 11:
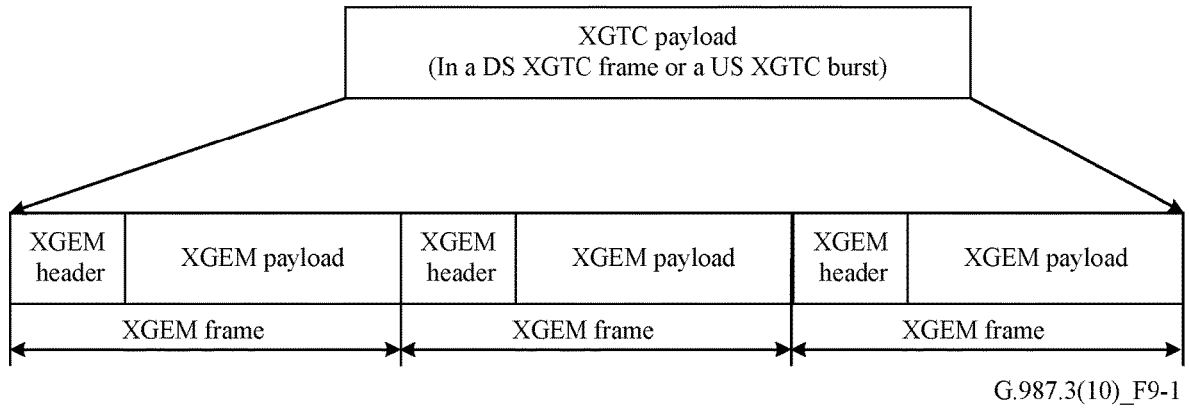
FIG. 11 is a structural diagram of a traditional XGTC payload composed of XG-PON encapsulation method (XGEM) frames.

A structure of a gigabit passive optical network (GPON)/10 gigabit passive optical network (XG-PON) protocol superframe is composed of a superframe head and a superframe payload. As shown in FIG. 8, in a GPON, the superframe includes a physical control block downstream (PCBd) and a GPON transmission convergence (GTC) payload. As shown in FIG. 10, in an XG-PON, the superframe includes an XG-PON transmission convergence (XGTC) header and an XGTC payload. The superframe payload is composed of GPON encapsulation method (GEM) frames (as shown in FIG. 9) and XG-PON encapsulation method (XGEM) frames (as shown in FIG. 11). In FIG. 10, physical layer operations, administration and maintenance (PLOAM) is included. In FIG. 11, a burst is included.

In an embodiment of the present disclosure, an OLT on a sending side may perform a downstream bandwidth allocation, obtain a result of the downstream bandwidth allocation through a downstream bandwidth allocation algorithm, i.e., a dynamic bandwidth allocation (DBA) algorithm, and send downstream data according to the downstream bandwidth allocation; the OLT may send the result of the downstream bandwidth allocation to each ONU of one or more ONUs, and each ONU may receive corresponding downstream data according to the result of the downstream bandwidth allocation and perform frame detection and data processing.

First Alternative Embodiment

Figure 12:
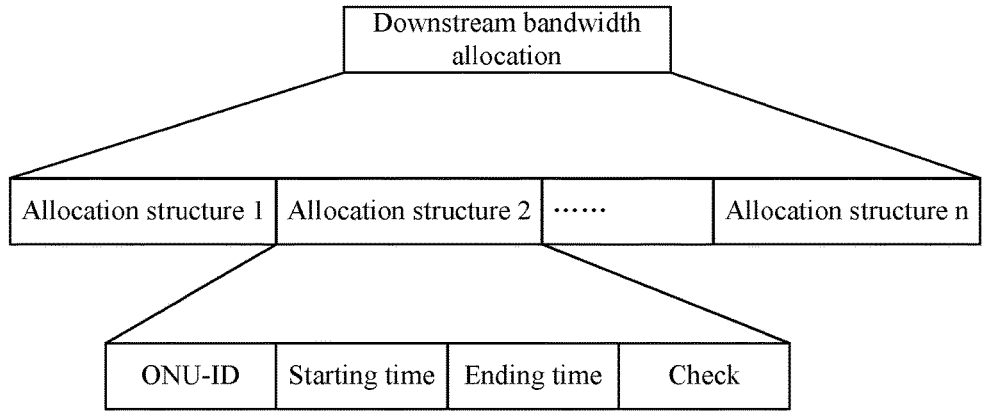
FIG. 12 is a structural diagram of a downstream bandwidth allocation in a GPON system according to an embodiment of the present disclosure.

For a GPON system, in a downstream superframe, a downstream bandwidth map (DS_BWmap) of the downstream bandwidth allocation may be carried before a GPON encapsulation method (GEM) frame or a superframe payload. Each bandwidth entry in the DS_BWmap may include an ONU-ID, and starting time and ending time in this superframe, as shown in FIG. 12.

Figure 13:
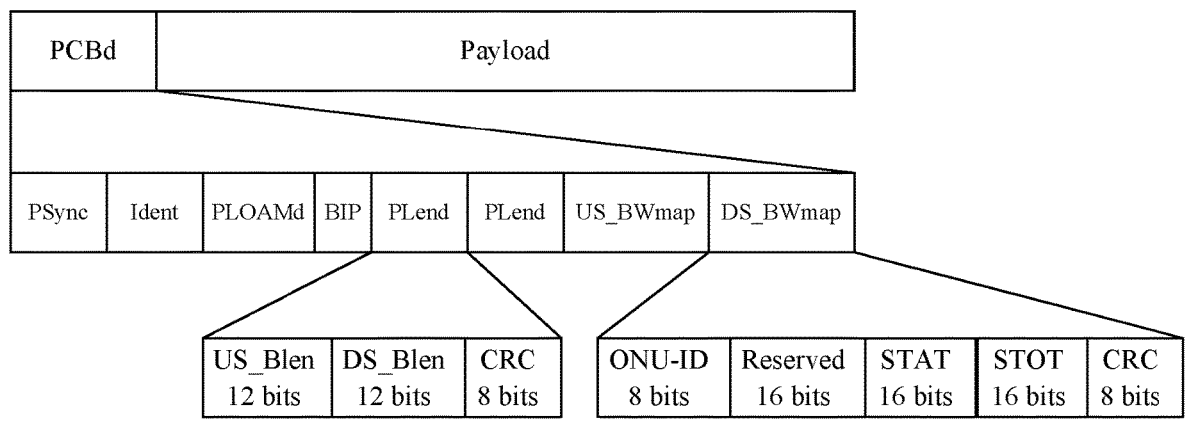
FIG. 13 is a diagram illustrating an implementation of a downstream bandwidth allocation in a GPON system according to an embodiment of the present disclosure.

The DS_BWmap is added into the GPON downstream superframe after an upstream bandwidth map (US_BWmap). Of course, a position of the DS_BWmap is only an exemplarily scheme of this embodiment, and the DS_BWmap may be configured elsewhere. A definition of the US_BWmap is borrowed, and the DS_BWmap may include 5 fields, as shown in FIG. 13.

ONU-ID: which identifies that a downstream bandwidth is allocated to which ONU. Reserved: which is a reserved field. Start time (abbreviated as STAT in FIG. 13): which represents the starting time of the downstream bandwidth.

Stop time (abbreviated as STOT in FIG. 13): which identifies the ending time of the downstream bandwidth. CRC: which represents CRC check bytes.

In addition, a PLend field may also be redefined. Original Blen is redefined as US_Blen, which represents a number of entries in the US_BWmap, and original Alen is redefined as DS_Blen, which identifies a number of entries in the DS_BWmap.

On the sending side:

One or more data queues may be established according to GEM Port-IDs, and a priority is configured for each queue of the one or more data queues. An OLT calculates a downstream bandwidth occupied by each queue of the one or more data queues in the superframe according to a data length, the priority and the like of each queue of the one or more data queues by using a downstream bandwidth scheduling algorithm, and performs an allocation. After the allocation is completed, appropriate adjustments may be performed. For example, bandwidths belonging to a same ONU are adjusted to be together, and then the DS_BWmap may be constructed. GEM Port-ID bandwidths belonging to a same ONU and adjacent to each other may be configured as one bandwidth entry in the DS_BWmap. After the number of bandwidth entries in the DS_BWmap is counted, the number may be set in DS_Blen of the PLend field. The OLT may send the superframe carrying DS_Blen and DS_BWmap field to the ONU.

On the receiving side:

After acquiring the physical synchronization (PSync), the ONU may acquire DS_Blen, and also acquire downstream bandwidth entries with a number of DS_Blen after the US_BWmap, that is, the DS_BWmap. The ONU may parse each downstream bandwidth entry, the CRC check may be performed first, when the CRC check is correct, it may be determined whether the ONU-ID in a downstream bandwidth entry is the same as the ONU-ID of the ONU itself, and when the ONU-ID is the same as the ONU-ID of the ONU itself, the start time and stop time may be acquired. Moreover, data in the corresponding downstream bandwidth may be obtained by parsing a current superframe payload and then GEM frames may be parsed.

Second Alternative Embodiment

Figure 14:
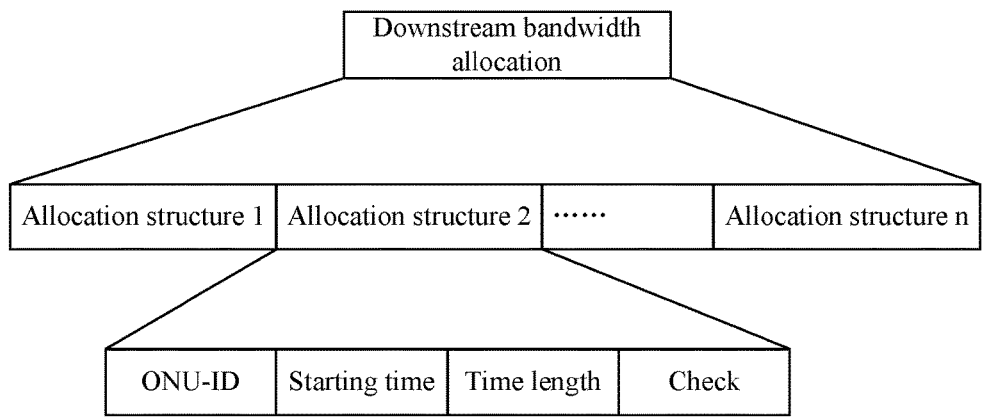
FIG. 14 is a schematic diagram of a downstream bandwidth allocation in an XG-PON system according to an embodiment of the present disclosure.

For an XG-PON1 system, in a downstream superframe, a downstream bandwidth map (DS_BWmap) of the downstream bandwidth allocation may be carried before an XGEM frame or a payload. Each bandwidth entry in the DS_BWmap may include an ONU-ID, and starting time and a bandwidth length in this superframe, as shown in FIG. 14.

Figure 15:
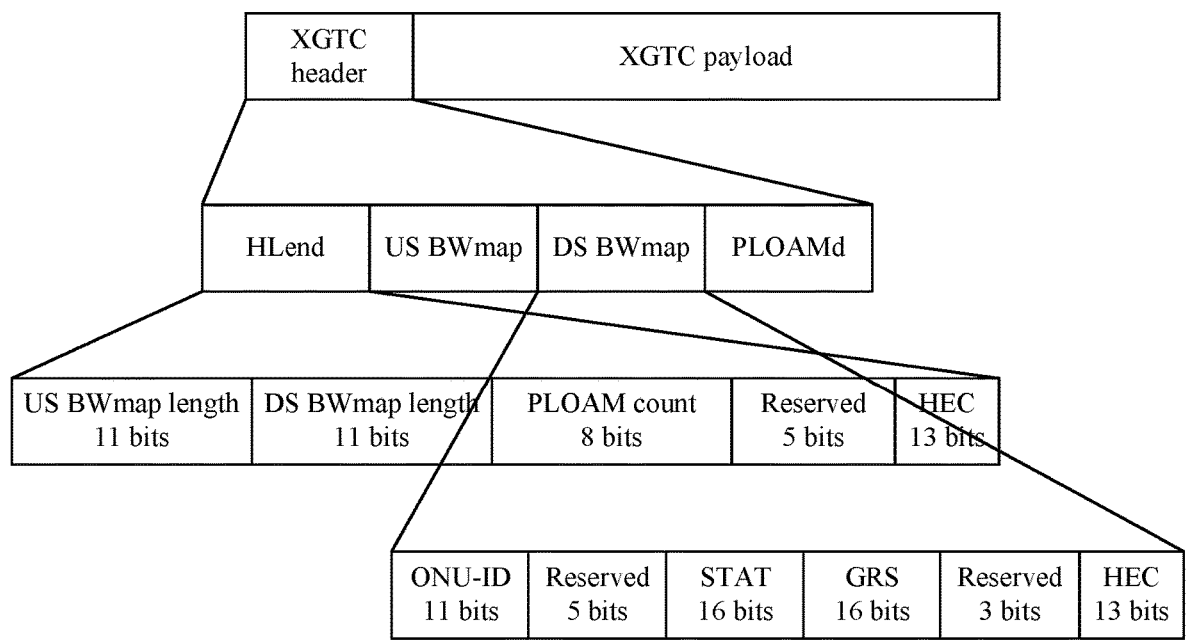
FIG. 15 is a diagram illustrating an implementation of a downstream bandwidth allocation in an XG-PON system according to an embodiment of the present disclosure.

The DS_BWmap may be added into the XG-PON1 downstream superframe after a US_BWmap. Of course, a position of the DS_BWmap is only an exemplarily scheme of this embodiment, and the DS_BWmap may be configured elsewhere. A definition of the US_BWmap is borrowed, and the DS_BWmap may include 5 fields, as shown in FIG. 15.

ONU-ID: which identifies that a downstream bandwidth is allocated to which ONU. Reserved: which is a reserved field. Start time (abbreviated as STAT in FIG. 15): which represents the starting time of the downstream bandwidth. Grant size (abbreviated as GRS in FIG. 15): which identifies a length of the downstream bandwidth. HEC: which represents HEC check bytes.

In addition, an HLend field may also be redefined. An original BWmap length is redefined as a US_BWmap length, which represents a number of entries in the US_BWmap, and a DS_BWmap length field is added after the US_BWmap length and represents a number of entries in the DS_BWmap.

On the sending side:

One or more data queues may be established according to XGEM Port-IDs, and a priority is configured for each queue of the one or more data queues. An OLT calculates a bandwidth occupied by each queue of the one or more data queues in the superframe according to the priority, a data length and the like of each queue of the one or more data queues by using the downstream bandwidth scheduling algorithm, and performs an allocation. After the allocation is completed, appropriate adjustments may be performed. For example, bandwidths belonging to a same ONU are adjusted to be together, and the DS_BWmap may be constructed. XGEM Port-ID bandwidths belonging to a same ONU and adjacent to each other may be configured as one bandwidth entry in the DS_BWmap. After the number of bandwidth entries in the DS_BWmap is counted, the number may be set in the DS_BWmap length of the HLend field. The OLT may send the superframe carrying DS_BWmap length and DS_BWmap field to the ONU.

On the receiving side:

The ONU may acquire the DS_BWmap length, and also acquire downstream bandwidth entries with a number of DS_BWmap length after the US_BWmap, that is, the DS_BWmap. The ONU may parse each downstream bandwidth entry, an HEC check may be performed first, when the HEC check is correct, it may be determined whether the ONU-ID in a downstream bandwidth entry is the same as the ONU-ID of the ONU itself. When the ONU-ID is the same as the ONU-ID of the ONU itself, the start time and grant size may be acquired. Moreover, data in the corresponding downstream bandwidth may be obtained by parsing a current superframe XGTC payload and then XGEM frames may be parsed.

Third Alternative Embodiment

This embodiment modifies the behaviors of the receiving side based on the first alternative embodiment.

An ONU may acquire the DS_BWmap length, and also acquire downstream bandwidth entries with a number of the DS_BWmap length after the US_BWmap, that is, the DS_BWmap. The ONU may parse each downstream bandwidth entry, the HEC check may be performed first, when the HEC check is correct, it may be determined whether an ONU-ID in a downstream bandwidth entry is the same as the ONU-ID of the ONU itself. If the ONU-ID is the same as the ONU-ID of the ONU itself, the ONU may acquire the start time and stop time, and also acquire corresponding data by parsing a next superframe payload, and then GEM frames may be parsed.

Fourth Alternative Embodiment

This embodiment modifies the behaviors of the receiving side based on the second alternative embodiment.

The ONU may acquire the DS_BWmap length, and also acquire downstream bandwidth entries with a number of the DS_BWmap length after the US_BWmap, that is, the DS_BWmap. The ONU may parse each downstream bandwidth entry, the HEC check may be performed first, when the HEC check is correct, it may be determined whether an ONU-ID in a downstream bandwidth entry is the same as the ONU-ID of the ONU itself. If the ONU-ID is the same as the ONU-ID of the ONU itself, the ONU may acquire the start time and grant size. Moreover, corresponding data may be obtained by parsing a next superframe XGTC payload and then XGEM frames may be parsed.

Fifth Alternative Embodiment

In an EPON/10GEPON system, a DS_GATE message for the downstream bandwidth allocation may be sent, where the LLID in the preamble field may indicate that a downstream bandwidth is allocated to which LLID.

Figure 16:
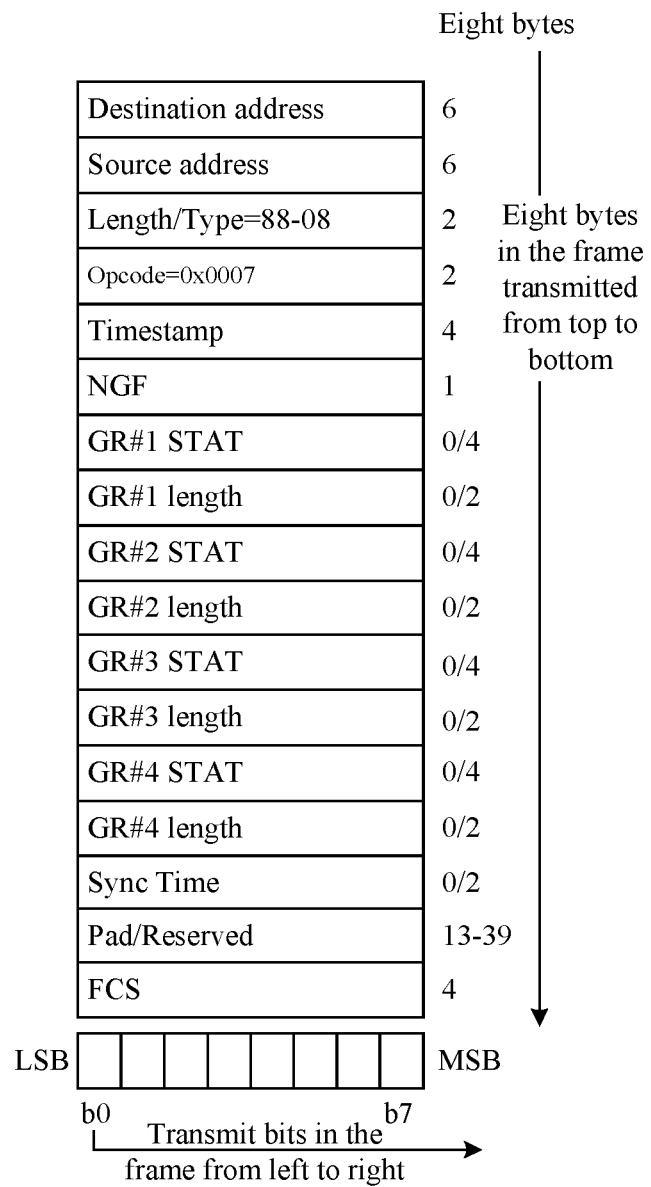
FIG. 16 is a structural diagram of a downstream bandwidth allocation (DS_GATE) message according to an embodiment of the present disclosure.

As shown in FIG. 16, a structure of the message is similar to that of GATE except that an Opcode field is modified as 0x0007, which indicates that the message is DS_GATE for allocating the downstream bandwidth. In FIG. 16, NG/F is short for a number of grants/Flags and represents a number of allocated downstream bandwidths, GR #1 to GR #4 are short for Grant #1 to Grant #4 respectively, and respectively represent allocated downstream bandwidth #1 to allocated downstream bandwidth #4. MSB and LSB are short for and represent a most significant bit and a least significant bit respectively.

LLID: the LLID in the preamble/SFD field represents that this message is allocated to which LLID. Since the EPON/10GEPON ONU has only one LLID, it is equivalent to indicating that this message is allocated to which ONU.

Opcode: a value of this field is 0x0007, representing that the message is DS_GATE for allocating the downstream bandwidth.

A group of the start time and the length represents one bandwidth entry, where the start time (abbreviated as STAT in FIG. 16) represents a starting time of a bandwidth entry, and the length represents a length of the bandwidth entry.

On the sending side:

One or more data queues may be established according to a virtual local area network (VLAN) priority and the like, and a priority is configured for each queue of the one or more data queues. An OLT calculates a bandwidth occupied by each queue of the one or more data queues according to a data length, the priority and the like of each queue of the one or more data queues by using a downstream bandwidth scheduling algorithm, and performs an allocation. After the allocation is completed, appropriate adjustments may be performed. For example, bandwidths belonging to a same ONU are adjusted to be together, and the DS_GATE may be constructed. Bandwidths belonging to a same ONU and adjacent to each other may be configured as one bandwidth entry in the DS_GATE. The OLT may send a superframe carrying the DS_GATE field to the ONU.

On the receiving side:

The ONU may acquire the DS_GATE, and perform LLID detection and the CRC check. When the CRC check is correct, the ONU may determine whether the LLID in the DS_GATE is the same as the LLID of the ONU itself. When the LLID is the same as the LLID of the ONU itself, the ONU may parse each downstream bandwidth entry to acquire the start time and length, then obtain corresponding data in a subsequent corresponding slot, and may parse EPON/10GEPON frames.

Sixth Alternative Embodiment

An embodiment of the present disclosure reuses GATE. For a next generation EPON (NGEPON), the PLID represents an ONU, and a PLID field is added into a bandwidth entry in GATE.

In an NGEPON system, the DS_GATE message for the downstream bandwidth allocation may be sent, where the preamble field carries a broadcast PLID, and the LLID (PLID) in the DS_GATE may indicate this bandwidth is allocated to which ONU.

As shown in FIG. 17, a structure of the message is similar to that of GATE except that the Opcode field is modified as 0x0012, representing that the message is DS_GATE for allocating the downstream bandwidth. In FIG. 17, GR is short for grant.

PLID: the PLID in the bandwidth entry represents the message is allocated to which ONU.

Opcode: the value of this field is 0x0012, representing that the message is DS_GATE for allocating the downstream bandwidth.

A group of the start time and length represents one bandwidth entry, where the start time (abbreviated as STAT in FIG. 17) represents a starting time of a bandwidth entry, and the length represents a length of the bandwidth entry.

On the sending side:

One or more data queues may be established according to a VLAN priority and the like, and a priority is configured for each queue of the one or more data queues. An OLT calculates a bandwidth occupied by each queue of the one or more data queues according to a data length, the priority and the like of each queue of the one or more data queues by using a downstream bandwidth scheduling algorithm, and performs an allocation. After the allocation is completed, appropriate adjustments may be performed. For example, bandwidths belonging to a same ONU are adjusted to be together, and DS_GATE may be constructed. Bandwidths belonging to a same ONU and adjacent to each other may be configured as one bandwidth entry in DS_GATE. The OLT may send a superframe of the DS_GATE field to the ONU.

On the receiving side:

The ONU may acquire the DS_GATE, and perform broadcast PLID detection and the CRC check. When the broadcast PLID is determined, the ONU may continue to parse bandwidth entries in the DS_GATE, and determine whether the PLID in a bandwidth entry is the same as the PLID of the ONU itself. When the PLID in the bandwidth entry is the same as the PLID of the ONU itself, the ONU may parse the corresponding downstream bandwidth entry to acquire the start time and length, obtain corresponding data in a subsequent corresponding slot, and may parse NGEPON frames.

An embodiment of the present disclosure further provides a computer-readable storage medium, which is configured to store computer-executable instructions which, when executed, implement the downstream bandwidth transmission method for a passive optical network described above.

Through the downstream bandwidth transmission method and apparatus for a passive optical network according to the embodiments of the present disclosure, the downstream bandwidth allocation is performed, the result of the downstream bandwidth allocation is sent, and the traffic data is sent based on the result of the downstream bandwidth allocation, where the result of the downstream bandwidth allocation carries the optical network unit (ONU) indication information. In the embodiments of the present disclosure, the downstream bandwidth is allocated to the ONU, and the corresponding ONU indication information is sent; and after parsing the result of downstream bandwidth allocation, the ONU receives the downstream traffic data within the corresponding downstream bandwidth, the unnecessary parsing and determination behaviors are avoided, thereby improving the system efficiency, reducing the energy consumption, and simplifying the system implementation complexity. In addition, wrong parsing of a certain frame header can be effectively prevented to parse subsequent data frames, and system reliability is improved.

It will be understood by those skilled in the art that the embodiments of the present disclosure may be provided as methods, systems or computer program products. Therefore, the present disclosure may adopt a hardware embodiment, a software embodiment, or a combination of hardware and software embodiments. In addition, the present disclosure may adopt the form of a computer program product implemented on one or more computer-usable storage media (including, but not limited to, a disk memory, an optical memory, etc.) that include computer-usable program codes.

The present disclosure is described with reference to flowcharts and/or block diagrams of methods, devices (systems) and computer program products according to the embodiments of the present disclosure. It can be understood that computer program instructions may be used for implementing each flow in the flowcharts and/or each block in the block diagrams, and a combination of flows in the flowcharts and/or a combination of blocks in the block diagrams. These computer program instructions may be provided for a processor of a general-purpose computer, a special-purpose computer, an embedded processor or another programmable data processing device to produce a machine, so that instructions, which are executed via the processor of the computer or another programmable data processing device, produce a means for implementing functions specified in one flow in the flowcharts, one or more blocks in the block diagrams, or at least one flow in the flowcharts and at least one block in the block diagrams.

These computer program instructions can also be stored in a computer-readable memory which can direct the computer or another programmable data processing device to operate in a particular manner, so that the instructions stored in the computer-readable memory produce a manufactured product including an instruction means. The instruction means implements the functions specified in one flow in the flowcharts, one or more blocks in the block diagrams, or at least one flow in the flowcharts and at least one block in the block diagrams.

These computer program instructions may also be loaded onto the computer or another programmable data processing device, so that a series of operations and steps are performed on the computer or another programmable device to produce processing implemented by the computer. Therefore, instructions executed on the computer or another programmable device provide steps for implementing the functions specified in one flow in the flowcharts, one or more blocks in the block diagrams, or at least one flow in the flowcharts and at least one block in the block diagrams.

It will be understood by those skilled in the art that functional modules/units in all or part of the steps of the methods, the systems and the apparatuses disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be performed jointly by several physical components. Some or all components may be implemented as software executed by processors such as digital signal processors or microcontrollers, hardware, or integrated circuits such as application integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory, or other memory technologies, a compact disc read-only memory (CD-ROM), a digital versatile disc (DVD) or other optical disc storage, a magnetic cassette, a magnetic tape, disk storage or other magnetic storage apparatuses, or any other medium used for storing desired information and accessible by a computer. In addition, as is known to those skilled in the art, the communication medium generally includes computer-readable instructions, data structures, program modules or other data in modulated data signals such as carriers or other transmission mechanisms, and may include any information delivery medium.

It will be understood by those skilled in the art that modifications or equivalent substitutions may be made to the technical schemes of the present disclosure without departing from the spirit and the scope of the technical schemes of the present disclosure, and such modifications and equivalent substitutions should fall within the scope of the claims of the present disclosure.

What is claimed is:

1. A downstream bandwidth transmission method for a passive optical network, comprising:
    performing, by an optical line terminal (OLT), a downstream bandwidth allocation;
    sending, by the OLT, a result of the downstream bandwidth allocation to a plurality of optical network units (ONUs); and
    sending, by the OLT, traffic data to the plurality of ONUs based on the result of the downstream bandwidth allocation, such that each of the plurality of ONUs only receives respective traffic data within a downstream bandwidth allocated to the respective ONU;
    wherein the result of the downstream bandwidth allocation sent by the OLT carries ONU indication information.

2. The method of claim 1, wherein performing, by the OLT, the downstream bandwidth allocation comprises:
    performing, by the OLT, the downstream bandwidth allocation based on a local traffic data queue.

3. The method of claim 2, wherein performing the downstream bandwidth allocation based on the local traffic data queue comprises:
    establishing at least one of local traffic data queues, and configuring a priority for each queue of the at least one of local traffic data queues; and
    determining, based on a downstream bandwidth scheduling algorithm, a downstream bandwidth occupied by each queue of the at least one of local traffic data queues according to a data length and the priority of each queue of the at least one of local traffic data queues, and performing the downstream bandwidth allocation.

4. A downstream bandwidth transmission apparatus for a passive optical network, comprising a processor and a memory configured to store computer programs executable on the processor;
    wherein the processor is configured to: when executing the computer programs, perform the method of claim 2.

5. The method of claim 3, wherein after determining the downstream bandwidth occupied by each of the at least one of local traffic data queues and performing the downstream bandwidth allocation, the method further comprises:
    configuring downstream bandwidths belonging to a same ONU to be consecutive.

6. A downstream bandwidth transmission apparatus for a passive optical network, comprising a processor and a memory configured to store computer programs executable on the processor;
    wherein the processor is configured to: when executing the computer programs, perform the method of claim 5.

7. A downstream bandwidth transmission apparatus for a passive optical network, comprising a processor and a memory configured to store computer programs executable on the processor;
    wherein the processor is configured to: when executing the computer programs, perform the method of claim 3.

8. The method of claim 1, wherein sending the result of the downstream bandwidth allocation to the plurality of ONUs comprises:
    carrying downstream bandwidth allocation information in a downstream frame, wherein each downstream bandwidth entry in the downstream bandwidth allocation information comprises the ONU indication information and downstream bandwidth feature information; or
    sending an indication message of the downstream bandwidth allocation, wherein the indication message carries the ONU indication information.

9. A downstream bandwidth transmission apparatus for a passive optical network, comprising a processor and a memory configured to store computer programs executable on the processor;
  wherein the processor is configured to: when executing the computer programs, perform the method of claim 1.

10. A downstream bandwidth transmission method for a passive optical network, comprising:
  receiving and parsing, by an optical network unit (ONU), a result of a downstream bandwidth allocation;
  determining, by the ONU, downstream bandwidth feature information corresponding to the ONU according to the result of the downstream bandwidth allocation; and
  receiving, by the ONU, traffic data for the ONU according to the downstream bandwidth feature information;
wherein the result of the downstream bandwidth allocation carries the ONU indication information.

11. The method of claim 10, wherein receiving and parsing the result of the downstream bandwidth allocation comprises:
  acquiring and parsing each downstream bandwidth entry; and
  determining whether the ONU indication information in a downstream bandwidth entry is consistent with identification information of the ONU.

12. The method of claim 11, wherein determining, by the ONU, the downstream bandwidth feature information corresponding to the ONU according to the result of the downstream bandwidth allocation, and receiving the traffic data for the ONU according to the downstream bandwidth feature information comprise:
  in response to determining that the ONU indication information in the downstream bandwidth entry is consistent with the identification information of the ONU, acquiring downstream bandwidth feature information in the downstream bandwidth entry as the downstream bandwidth feature information corresponding to the ONU, and obtaining the traffic data for the ONU according to the downstream bandwidth feature information corresponding to the ONU; and
  in response to determining that the ONU indication information in the downstream bandwidth entry is inconsistent with the identification information of the ONU, not acquiring the downstream bandwidth feature information in the downstream bandwidth entry, and not obtaining traffic data corresponding to the downstream bandwidth feature information in the downstream bandwidth entry.

13. A downstream bandwidth transmission apparatus for a passive optical network, wherein the apparatus is applied for the downstream bandwidth transmission method for the passive optical network of claim 6 and configured in an optical network unit (ONU), comprising:
  a first receiving module, which is configured to receive and parse a result of a downstream bandwidth allocation, and determine downstream bandwidth feature information corresponding to the ONU according to the result of the downstream bandwidth allocation; and
  a second receiving module, which is configured to receive traffic data for the ONU according to the downstream bandwidth feature information;
wherein the result of the downstream bandwidth allocation carries the ONU indication information.

14. The apparatus of claim 13, wherein the first receiving module comprises:
  a parsing unit, which is configured to acquire and parse each downstream bandwidth entry; and
  a determination unit, which is configured to determine whether the ONU indication information in a downstream bandwidth entry is consistent with identification information of an ONU.

15. A downstream bandwidth transmission apparatus for a passive optical network, comprising a processor and a memory configured to store computer programs executable on the processor;
  wherein the processor is configured to: when executing the computer programs, perform the method of claim 10.

16. A downstream bandwidth allocation method for a passive optical network, comprising:
  performing, by an optical line terminal (OLT), a downstream bandwidth allocation, sending a result of the downstream bandwidth allocation to a plurality of optical network units (ONUs), and sending traffic data to the plurality of ONUs based on the result of the downstream bandwidth allocation, such that each of the plurality of ONUs only receives respective traffic data within a downstream bandwidth allocated to the respective ONU; and
  receiving and parsing, by one ONU of the plurality of ONUs, the result of the downstream bandwidth allocation, determining, by the one ONU, downstream bandwidth feature information corresponding to the ONU according to the result of the downstream bandwidth allocation; and receiving traffic data for the one ONU according to the downstream bandwidth feature information;
wherein the result of the downstream bandwidth allocation carries the ONU indication information.

17. A downstream bandwidth transmission apparatus for a passive optical network, wherein the apparatus is applied for the downstream bandwidth transmission method for the passive optical network of claim 1 and configured in an optical line terminal (OLT), comprising:
  an allocation module, which is configured to perform a downstream bandwidth allocation; and
  a sending module, which is configured to send a result of the downstream bandwidth allocation to a plurality of optical network units (ONUs) and send traffic data to the plurality of ONUs based on the result of the downstream bandwidth allocation, such that each of the plurality of ONUs only receives respective traffic data within a downstream bandwidth allocated to the respective ONU;
wherein the result of the downstream bandwidth allocation carries ONU indication information.

18. The apparatus of claim 17, wherein the allocation module comprises:
  a configuration unit, which is configured to establish at least one of local traffic data queues, and configure a priority for each queue of the at least one of local traffic data queues; and
  a processing unit, which is configured to: based on a downstream bandwidth scheduling algorithm and according to a data length and the priority of each queue of the at least one of local traffic data queues, determine a downstream bandwidth occupied by each queue of the at least one of local traffic data queues and perform the downstream bandwidth allocation.

19. The apparatus of claim 17, wherein the sending module comprises:
  a first sending unit, which is configured to carry downstream bandwidth allocation information in a downstream frame, wherein each downstream bandwidth entry in the downstream bandwidth allocation information comprises the ONU indication information and downstream bandwidth feature information; or a second sending unit, which is configured to send an indication message of the downstream bandwidth allocation, wherein the indication message carries the ONU indication information.

20. The apparatus of claim 17, wherein the allocation module is further configured to configure downstream bandwidths belonging to a same ONU to be consecutive.

* * * * *